United States Patent
Park et al.

(10) Patent No.: US 10,474,421 B2
(45) Date of Patent: Nov. 12, 2019

(54) ELECTRONIC DEVICE AND METHOD FOR PROCESSING AUDIO DATA

(71) Applicant: Samsung Electronics Co., Ltd., Gyeonggi-do (KR)

(72) Inventors: Sangsoo Park, Gyeonggi-do (KR); Jaehyun Kim, Gyeonggi-do (KR); Limsam Lim, Gyeonggi-do (KR); Namil Lee, Gyeonggi-do (KR); Hochul Hwang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 69 days.

(21) Appl. No.: 15/436,241

(22) Filed: Feb. 17, 2017

(65) Prior Publication Data

US 2017/0242652 A1    Aug. 24, 2017

(30) Foreign Application Priority Data

Feb. 18, 2016  (KR) ..................... 10-2016-0019309

(51) Int. Cl.
*G06F 17/00*   (2019.01)
*G06F 3/16*    (2006.01)
*G11B 20/10*   (2006.01)

(52) U.S. Cl.
CPC ........ *G06F 3/165* (2013.01); *G11B 20/10527* (2013.01)

(58) Field of Classification Search
CPC ... G06F 3/165; G06F 13/28; G11B 20/10527; G11B 2020/10546; G11B 2020/10555; G11B 2020/10564; G11B 2020/10574; G11B 2020/10592; G11B 2020/10703; G11B 2020/10722; G11B 2020/1087; Y02D 10/14

See application file for complete search history.

(56) References Cited

U.S. PATENT DOCUMENTS

| | | | |
|---|---|---|---|
| 2008/0091851 A1* | 4/2008 | Sierra | G06F 3/16 710/22 |
| 2010/0158260 A1 | 6/2010 | Huddart et al. | |
| 2011/0112668 A1* | 5/2011 | Sorensen | G10L 21/0208 700/94 |
| 2012/0246352 A1* | 9/2012 | Lim | G06F 13/28 710/22 |
| 2013/0089208 A1 | 4/2013 | Fairey | |
| 2013/0195103 A1 | 8/2013 | Han | |
| 2014/0037111 A1 | 2/2014 | Uhle et al. | |
| 2014/0358262 A1* | 12/2014 | Yerrace | G06F 17/3074 700/94 |

(Continued)

FOREIGN PATENT DOCUMENTS

WO    WO 2014/184353    11/2014

OTHER PUBLICATIONS

International Search Report dated May 23, 2017 issued in counterpart application No. PCT/KR2017/001722, 3 pages.

*Primary Examiner* — Fan S Tsang
*Assistant Examiner* — David Siegel
(74) *Attorney, Agent, or Firm* — The Farrell Law Firm, P.C.

(57) ABSTRACT

Methods and apparatuses are provided for processing audio data at an electronic device. Audio data is obtained. A type of the audio data is identified. An audio processing mode corresponding to the type of the audio data is selected. An audio track of the audio data is output, based on the audio processing mode.

16 Claims, 10 Drawing Sheets

(56) References Cited

U.S. PATENT DOCUMENTS

2015/0045921 A1    2/2015   Stewart et al.
2015/0117685 A1    4/2015   Reiss et al.
2015/0207481 A1    7/2015   Duwenhorst et al.
2015/0333951 A1   11/2015   Yeom et al.
2016/0073215 A1    3/2016   De Bruijn et al.

* cited by examiner

ELECTRONIC DEVICE AND METHOD FOR PROCESSING AUDIO DATA

PRIORITY

This application claims priority under 35 U.S.C. § 119(a) to Korean Patent Application No. 10-2016-0019309, filed in the Korean Intellectual Property Office on Feb. 18, 2016, the disclosure of which is incorporated herein by reference.

BACKGROUND

1. Field of the Disclosure

The present disclosure relates generally to an electronic device and a method for processing audio data, and more particularly, to an electronic device and a method for processing audio data in accordance with an audio type and an audio processing mode.

2. Description of the Related Art

In accordance with the respective growths in related technologies, electronic devices have outgrown their respective traditional fields and have reached a mobile convergence stage in which the fields of other device types are incorporated.

An electronic device may process and output audio data received from an external device or associated with an application stored in a memory. Through audio data processing, the electronic device may output audio signals having various volumes and qualities. For example, the electronic device may output a ringtone, a music sound, a touch sound, and the like.

Further, the electronic device may output audio signals associated with the execution of various applications. Although various pieces of audio data require different processing throughputs and different output time delays, the same audio processing algorithm is applied regardless of audio data type. This causes the electronic device to process the audio data inefficiently.

In addition, typical audio data processing that is based on the same algorithm deteriorates the quality of the audio output.

SUMMARY

The present disclosure has been made to address at least the above problems and/or disadvantages and to provide at least the advantages described below. Accordingly, an aspect of the present disclosure provides a method for processing audio data and an electronic device for implementing the method.

According to an embodiment of the present disclosure, an electronic device is provided that includes a memory, an audio output module, and a processor electrically connected to the memory and the audio output module. The processor is configured to obtain audio data, identify a type of the audio data, select an audio processing mode corresponding to the type of the audio data, and output an audio track of the audio data, based on the audio processing mode.

According to an embodiment of the present disclosure, an electronic device is provided that includes a memory, an audio output module, and a processor electrically connected to the memory and the audio output module. The processor is configured to obtain audio data, determine whether the audio data is an audio track requiring an improvement in an output response speed, and select a first mode, if the audio data is the audio track requiring the improvement in the output response speed. If the audio data is not the audio track requiring the improvement in the output response speed, the processor is further configured to determine whether the audio data is an audio track requiring an improvement in a sound quality, select a second mode if the audio data is the audio track requiring the improvement in the sound quality, and select a third mode if the audio data is not the audio track requiring the improvement in the sound quality.

According to an embodiment of the present disclosure, a method is provided for processing audio data at an electronic device. Audio data is obtained. A type of the audio data is identified. An audio processing mode corresponding to the type of the audio data is selected. An audio track of the audio data is output, based on the audio processing mode.

BRIEF DESCRIPTION OF THE DRAWINGS

The above and other aspects, features, and advantages of the present disclosure will be more apparent from the following detailed description when taken in conjunction with the accompanying drawings, in which.

DETAILED DESCRIPTION

Figure 1:
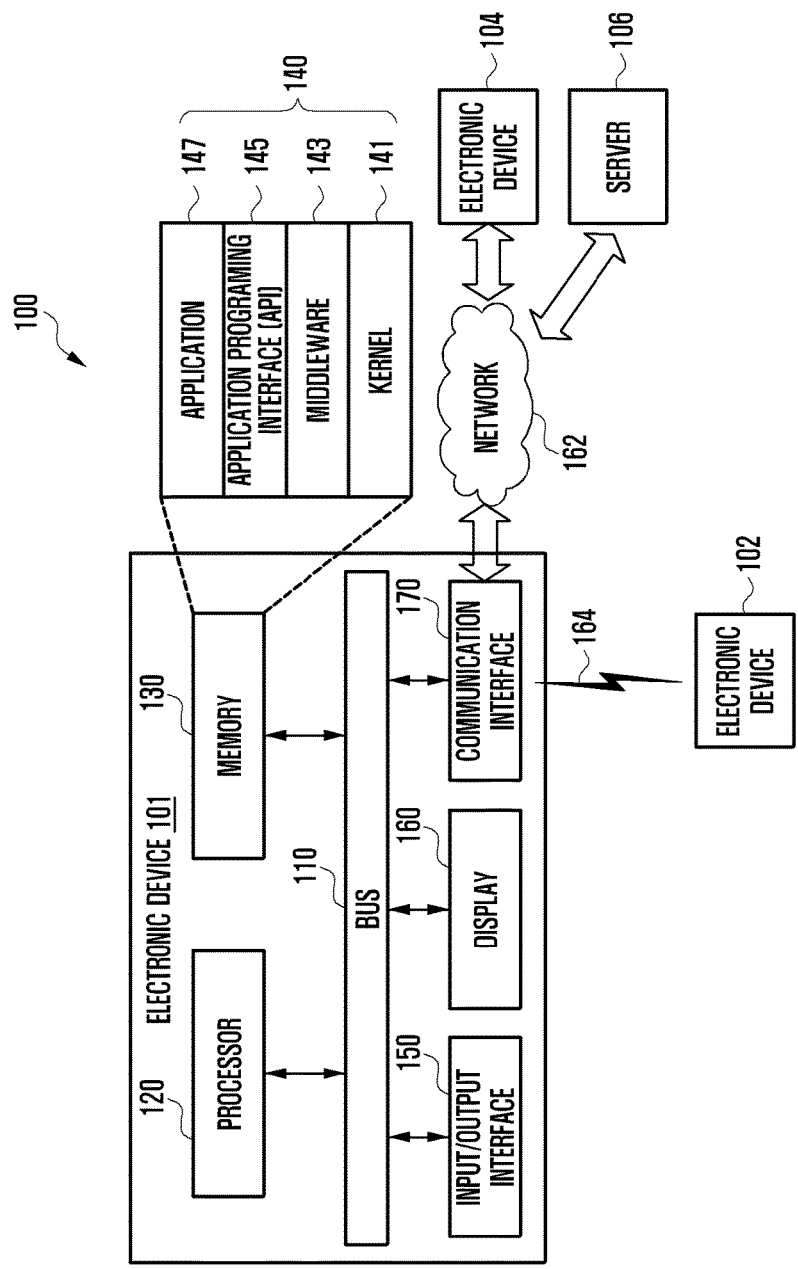
FIG. 1 is a block diagram illustrating a network environment, according to an embodiment of the present disclosure.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

The present disclosure is not limited to the particular embodiments described herein, but includes all modifications, equivalents, and/or alternatives within the spirit and scope of the present disclosure.

Herein, the expressions "include" and "may include" refer to the existence of a corresponding function, operation, or element, and do not limit the inclusion of one or more additional functions, operations, or elements. Terms such as "include" and "have" may be construed to denote a certain characteristic, number, step, operation, constituent element, component or a combination thereof, but are not to be construed to exclude the existence or a possibility of addition of one or more other characteristics, numbers, steps, operations, constituent elements, components or combinations thereof.

Herein, the expression "or" includes any or all combinations of words enumerated together. For example, the expression "A or B" may include A, B, or both A and B.

Herein, expressions including ordinal numbers, such as "first" and "second," may modify various elements. However, such elements are not limited by the above expressions. For example, the above expressions do not limit the sequence and/or importance of the elements. The above expressions are used merely for the purpose of distinguishing an element from the other elements. For example, a first user device and a second user device indicate different user devices although both of them are user devices. For example, a first element could be referred to as a second element, and similarly, a second element could be also referred to as a first element without departing from the scope of the present disclosure.

When an element is referred to as being "connected to" or "accessed by" other elements, it should be understood that the element may be directly connected to or accessed by the other elements, or another element may exist between them. Contrarily, when an element is referred to as being "directly coupled to" or "directly connected by" any other element, it should be understood that no element is interposed therebetween.

Herein, the terms are used to describe specific embodiments, and are not intended to limit the present disclosure. Singular forms are intended to include plural forms as well, unless the context clearly indicates otherwise.

Unless defined differently, all terms used herein, which include technical terminologies or scientific terminologies, have the same meanings as those understood by a person skilled in the art to which the present invention belongs. Terms such as those defined in a generally used dictionary are to be interpreted to have meanings equivalent to the contextual meanings in the relevant field of art, and are not to be interpreted to have ideal or excessively formal meanings unless clearly defined in the present specification.

An electronic device, according to an embodiment the present disclosure, may include a display. For example, the electronic device may be embodied as at least one of a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a mobile medical device, a camera, a wearable device (for example, a head-mounted device (HMD) such as electronic glasses, electronic clothes, an electronic bracelet, an electronic necklace, an electronic accessory, an electronic tattoo, and a smart watch.

According to some embodiments of the present disclosure, the electronic device may be a smart home appliance. The smart home appliances may be embodied as at least one of, for example, televisions, digital versatile disc (DVD) players, audio players, refrigerators, air conditioners, cleaners, ovens, microwaves, washing machines, air purifiers, set-top boxes, TV boxes, game consoles, electronic dictionaries, electronic keys, camcorders, or electronic frames.

According to some embodiments of the present disclosure, the electronic device may include at least one of various types of medical devices (for example, magnetic resonance angiography (MRA), magnetic resonance imaging (MRI), computed tomography (CT), a scanning machine, ultrasonic wave device and the like), a navigation device, a global positioning system (GPS) receiver, an event data recorder (EDR), a flight data recorder (FDR), a car infotainment device, ship electronic equipment (for example, navigation equipment for a ship, a gyro compass and the like), avionics, a security device, and an industrial or home robot.

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. Further, it is obvious to those skilled in the art that the electronic device is not limited to the aforementioned devices.

Hereinafter, an electronic device according to various embodiments is described with reference to the accompanying drawings. The term "user" may refer to a person who uses an electronic device or a device (e.g., an artificial intelligence electronic device) that uses an electronic device.

FIG. 1 is a diagram illustrating a network environment including an electronic device, according to an embodiment of the present disclosure.

Referring to FIG. 1, an electronic device 101, in a network environment 100, includes a bus 110, a processor 120, a memory 130, an input/output interface 150, a display 160, and a communication interface 170. The electronic device 101 may omit at least one of the components or include one or more additional components.

The bus 110 may be a circuit connecting the above described components and transmitting communication (e.g., a control message) between the above-described components.

The processor 120 may include one or more of a central processing unit (CPU), an application processor (AP), and a communication processor (CP). For example, the processor 120 may control at least one component of the electronic device 101 and/or execute calculation relating to communication or data processing.

The memory 130 may include a volatile and/or non-volatile memory. For example, the memory 130 may store a command or data relating to at least one component of the electronic device 101. The memory may store software and/or a program 140. For example, the program 140 includes a kernel 141, middleware 143, an application programming interface (API) 145, and an application 147. At least one portion of the kernel 141, the middleware 143, and the API 145 may be defined as an operating system (OS).

The kernel 141 controls or manages system resources (e.g., the bus 110, the processor 120, or the memory 130) used for executing an operation or function implemented by the remaining other program, for example, the middleware 143, the API 145, or the application 147. Further, the kernel 141 provides an interface for accessing individual components of the electronic device 101 from the middleware 143, the API 145, or the application 147 to control or manage the components.

The middleware 143 performs a relay function of allowing the API 145 or the application 147 to communicate with the kernel 141 to exchange data. Further, in operation requests received from the application 147, the middleware 143 controls the operation requests (e.g., scheduling or load balancing) by using a method of assigning a priority, by which system resources (e.g., the bus 110, the processor 120, the memory 130, and the like) of the electronic device 101 may be used, to the application 147.

The API 145 is an interface by which the application 147 may control a function provided by the kernel 141 or the middleware 142 and includes, for example, at least one interface or function (e.g., command) for a file control, a window control, image processing, or a character control.

The input/output interface 150 may transmit a command or data inputted by a user or another external device to another component(s) of the electronic device 101. Further, the input/output interface 150 may output the command or data received from the other component(s) of the electronic device 101 to the user or the other external device.

The display 160 may include, for example, liquid crystal display (LCD), light emitting diode (LED), organic LED (OLED), or micro electro mechanical system (MEMS) display, or an electronic paper display. The display 160 may display, for example, various contents (text, image, video, icon, or symbol, and so on) to a user. The display 160 may include a touch screen, and receive touch, gesture, approaching, or hovering input using a part of the body of the user.

The communication interface 170 may set communication of the electronic device 101 and external device (e.g., a first external device 102, a second external device 104, or a server 106). For example, the communication interface 170 may be connected with the network 162 through wireless communication or wire communication and communicate with the external device 104 or the server 106.

Wireless communication may use, as a cellular communication protocol, at least one of long-term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM), and the like, for example. A short-range communication 164 may include, for example, at least one of Wi-Fi, Bluetooth, near field communication (NFC), magnetic secure transmission or near field magnetic data stripe transmission (MST), and global navigation satellite system (GNSS), and the like.

The GNSS may include at least one of, for example, a global positioning system (GPS), a global navigation satellite system (Glonass), a Beidou navigation satellite system (Beidou), and Galileo (European global satellite-based navigation system). Hereinafter, the term "GPS" may be interchangeably used with the term "GNSS". Wired communication may include, for example, at least one of universal serial bus (USB), high definition multimedia interface (HDMI), recommended standard-232 (RS-232), plain old telephone service (POTS), and the like. The network 162 may include a telecommunication network, for example, at least one of a computer network (e.g., local area network (LAN) or wide area network (WAN)), the Internet, and a telephone network.

Each of the first external device 102 and the second external device 104 may be the same type or a different type of device as that of the electronic device 101. The server 106 may include one or more group of servers. At least one portion of executions executed by the electronic device may be performed by one or more electronic devices 102, 104, or the server 106. When the electronic device 101 should perform a function or service automatically, the electronic device 101 may request performing of at least one function to the other device. For the above, cloud computing technology, distributed computing technology, or client-server computing technology may be used, for example.

Figure 2:
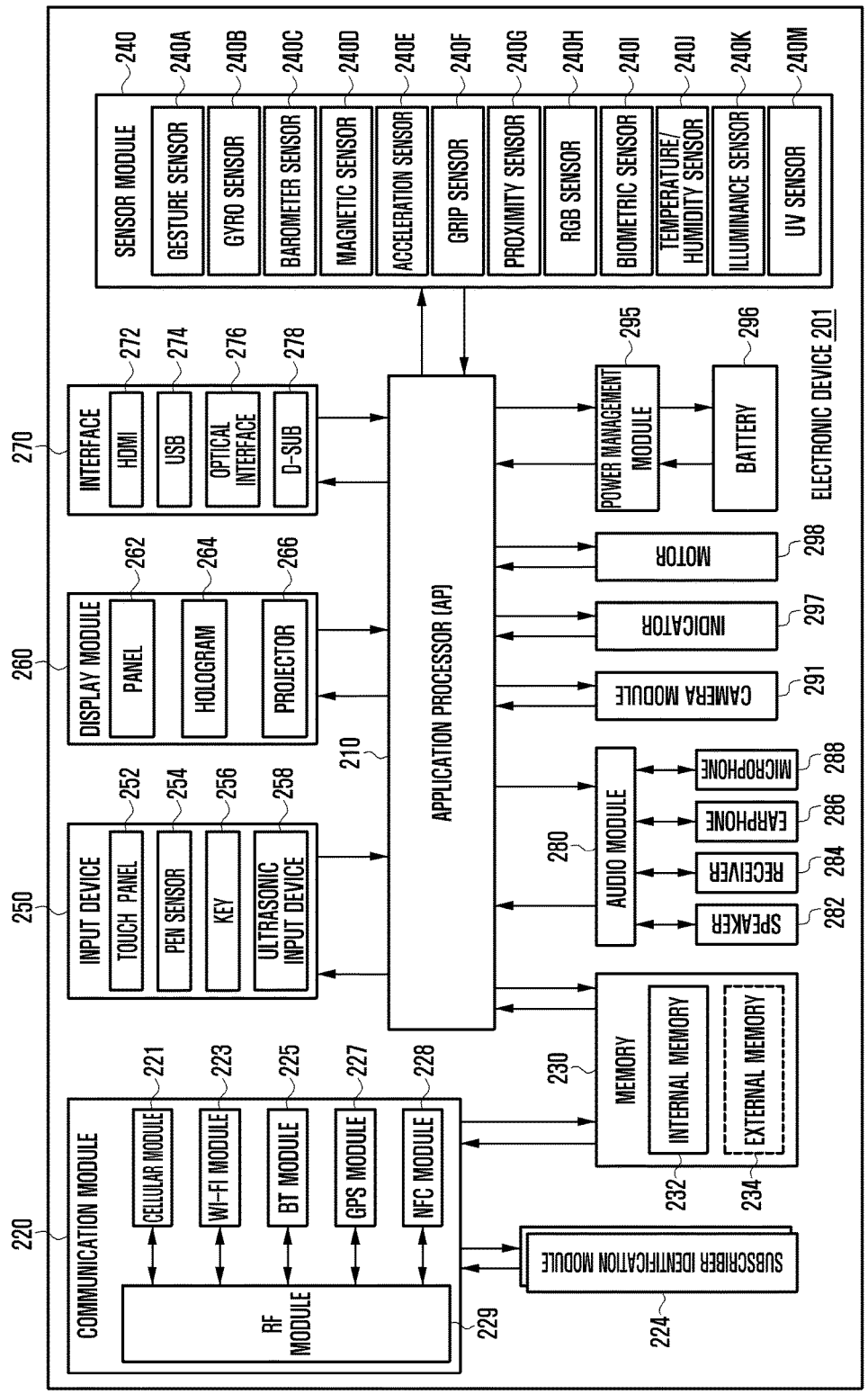
FIG. 2 is a block diagram illustrating an electronic device, according to an embodiment of the present disclosure.

FIG. 2 is a block diagram illustrating an electronic device, according to an embodiment of the present disclosure.

Referring to FIG. 2, an electronic device 201 may configure, for example, a whole or a part of the electronic device 101 of FIG. 1. The electronic device 201 includes one or more APs 210, a communication module 220, a subscriber identification module (SIM) 224, a memory 230, a sensor module 240, an input device 250, a display 260, an interface 270, an audio module 280, a camera module 291, a power managing module 295, a battery 296, an indicator 297, and a motor 298.

The AP 210 operates an OS or an application program so as to control a plurality of hardware or software component elements connected to the AP 210, and execute various data processing and calculations including multimedia data. The AP 210 may be implemented by, for example, a system on chip (SoC). The AP 210 may further include a graphics processing unit (GPU) and/or image signal processor. The AP 210 may include at least a portion of the components illustrated in FIG. 2 (e.g., a cellular module 221). The AP 210 may load a command or data received from at least one other component (e.g., a non-volatile memory), and store various data in the non-volatile memory.

The communication module 220 may include the same or similar components as the communication interface 170 of FIG. 1. The communication module 220, for, example, may include the cellular module 221, a Wi-Fi module 223, a BT module 225, a GPS module 227, a NFC module 228, and a radio frequency (RF) module 229.

The cellular module 221 provides a voice, a call, a video call, a short message service (SMS), or an internet service through a communication network (e.g., LTE, LTE-A, CDMA, WCDMA, UMTS, WiBro, GSM and the like). Further, the cellular module 221 may distinguish and authenticate electronic devices within a communication network by using a SIM (e.g., the SIM 224). The cellular module 221 performs at least some of the functions that may be provided by the AP 210. For example, the cellular module 221 may perform at least some of the multimedia control functions. According to an embodiment, the cellular module 221 may include a CP.

Each of the Wi-Fi module 223, the BT module 225, the GPS module 227, and the NFC module 228 may include, for example, a processor for processing data transmitted/received through the corresponding module. Although the cellular module 221, the Wi-Fi module 223, the BT module 225, the GPS module 227, and the NFC module 228 are at least some (e.g., two or more) of the cellular module 221, the Wi-Fi module 223, the BT module 225, the GPS module 227, and the NFC module 228 may be included in one integrated circuit (IC) or one IC package. For example, at least some (e.g., the CP corresponding to the cellular module 221 and the Wi-Fi processor corresponding to the Wi-Fi module 223 of the processors corresponding to the cellular module 221, the Wi-Fi module 223, the BT module 225, the GPS module 227, and the NFC module 228 may be implemented by one SoC.

The RF module 229 transmits/receives data, for example, an RF signal. The RF module 229 may include, for example, a transceiver, a power amp module (PAM), a frequency filter, a low noise amplifier (LNA), and the like. Further, the RF module 229 may further include a component for transmitting/receiving electronic waves over a free air space in wireless communication, for example, a conductor, a conducting wire, and the like. Although the cellular module 221, the Wi-Fi module 223, the BT module 225, the GPS module 227, and the NFC module 228 share one RF module 229 in FIG. 2, at least one of the cellular module 221, the Wi-Fi module 223, the BT module 225, the GPS module 227, and the NFC module 228 may transmit/receive an RF signal through a separate RF module.

The SIM 224 is a card including a SIM and may be inserted into a slot formed in a particular portion of the electronic device. The SIM 224 includes unique identification information (e.g., integrated circuit card identifier (ICCID)) or subscriber information (e.g., international mobile subscriber identity (IMSI).

The memory 230 (e.g., the memory 130 of FIG. 1 includes at least one of an internal memory 232 and an external memory 234. The internal memory 232 may include, for example, at least one of a volatile memory (e.g., a random access memory (RAM), a dynamic RAM (DRAM), a static RAM (SRAM), a synchronous dynamic RAM (SDRAM), and the like), and a non-volatile memory (e.g., a read only memory (ROM), a one-time programmable ROM (OTPROM), a programmable ROM (PROM), an erasable and programmable ROM (EPROM), an electrically erasable and programmable ROM (EEPROM), a mask ROM, a flash ROM, a not and (NAND) flash memory, a not or (NOR) flash memory, and the like).

According to an embodiment of the present disclosure, the internal memory 232 may be a solid state drive (SSD). The external memory 234 may further include a flash drive, for example, a compact flash (CF), a secure digital (SD), a micro-SD, a mini-SD, an extreme digital (xD), or a memory stick. The external memory 234 may be functionally connected to the electronic device 201 through various interfaces. The electronic device 201 may further include a storage device (or storage medium) such as a hard drive.

The sensor module 240 measures a physical quantity or detects an operation state of the electronic device 201, and converts the measured or detected information to an electronic signal. The sensor module 240 includes, for example, at least one of a gesture sensor 240A, a gyro sensor 240B, an atmospheric pressure (barometric) sensor 240C, a magnetic sensor 240D, an acceleration sensor 240E, a grip sensor 240F, a proximity sensor 240G a color sensor 240H (e.g., red, green, and blue (RGB) sensor) 240H, a biometric sensor 240I, a temperature/humidity sensor 240J, an illumination (light) sensor 240K, and a ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor, a fingerprint sensor (not illustrated), and the like. The sensor module 240 may further include a control circuit for controlling one or more sensors included in the sensor module 240.

The input device 250 includes at least one of a touch panel 252, a (digital) pen sensor 254, a key 256, and an ultrasonic input device 258. For example, the touch panel 252 may recognize a touch input in at least one type of a capacitive type, a resistive type, an infrared type, and an acoustic wave type. The touch panel 252 may further include a control circuit. In the capacitive type, the touch panel 252 may recognize proximity as well as a direct touch. The touch panel 252 may further include a tactile layer. In this event, the touch panel 252 provides a tactile reaction to the user.

The (digital) pen sensor 254 may be implemented, for example, using a method identical or similar to a method of receiving a touch input of the user, or using a separate recognition sheet. The key 256 may include, for example, a physical button, an optical key, or a key pad. The ultrasonic input device 258 is a device which may detect an acoustic wave by a microphone 288 of the electronic device 201 through an input means generating an ultrasonic signal to identify data and may perform wireless recognition. The electronic device 201 receives a user input from an external device (e.g., computer or server) connected to the electronic device 201 by using the communication module 220.

The display 260 (e.g., display 160) includes at least one of a panel 262, a hologram device 264, and a projector 266. The panel 262 may be, for example, a LCD or an active matrix OLED (AM-OLED). The panel 262 may be implemented to be, for example, flexible, transparent, or wearable. The panel 262 may be configured by the touch panel 252 and one module. The hologram device 264 shows a stereoscopic image in the air by using interference of light. The projector 266 projects light on a screen to display an image. For example, the screen may be located inside or outside the electronic device 201. The display 260 may further include a control circuit for controlling the panel 262, the hologram device 264, and the projector 266.

The interface 270 includes, for example, a HDMI 272, an USB 274, an optical interface 276, and a D-subminiature (D-sub) 278. The interface 270 may be included in, for example, the communication interface 170 of FIG. 1. Additionally or alternatively, the interface 270 may include, for example, a mobile high-definition link (MHL) interface, an SD card/multi-media card (MMC), or an infrared data association (IrDA) standard interface.

The audio module 280 bi-directionally converts a sound and an electronic signal. At least some components of the audio module 280 may be included in, for example, the input/output interface 150 of FIG. 1. The audio module 280 processes sound information input or output through, for example, a speaker 282, a receiver 284, an earphone 286, the microphone 288 and the like.

The camera module 291 is a device that may photograph a still image and a video. The camera module 291 may include one or more image sensors (e.g., a front sensor or a back sensor), an image signal processor (ISP), or a flash (e.g., an LED or xenon lamp).

The power managing module 295 manages power of the electronic device 201. The power managing module 295 may include, for example, a power management integrated circuit (PMIC), a charger IC, or a battery gauge.

The PMIC may be mounted to, for example, an integrated circuit or an SoC semiconductor. A charging method may be divided into wired and wireless methods. The charger IC charges a battery and prevent over voltage or over current from flowing from a charger. According to an embodiment, the charger IC includes a charger IC for at least one of the wired charging method and the wireless charging method. The wireless charging method may include, for example, a magnetic resonance method, a magnetic induction method and an electromagnetic wave method, and additional circuits for wireless charging, for example, circuits such as a coil loop, a resonant circuit, a rectifier and the like may be added.

The battery gauge measures, for example, a remaining quantity of the battery 296, or a voltage, a current, or a temperature during charging. The battery 296 may store or generate electricity and supply power to the electronic device 201 by using the stored or generated electricity. The battery 296 may include a rechargeable battery or a solar battery.

The indicator 297 shows particular statuses of the electronic device 201 or a part (e.g., the AP 210) of the electronic device 201, for example, a booting status, a message status, a charging status and the like. The motor 298 converts an electrical signal to a mechanical vibration. Although not illustrated, the electronic device 201 may include a processing unit (e.g., GPU) for supporting a module TV. The processing unit for supporting the mobile TV may process, for example, media data according to a standard of digital multimedia broadcasting (DMB), digital video broadcasting (DVB), media-Flo and the like.

Each of the components of the electronic device, according to embodiments of the present disclosure, may be implemented by one or more components and the name of the corresponding component may vary depending on a type of the electronic device. The electronic device may include at least one of the above described components, a few of the components may be omitted, or additional components may be further included. Also, some of the components of the electronic device according may be combined to form a single entity, and thus, may equivalently execute functions of the corresponding components before being combined.

Figure 3:
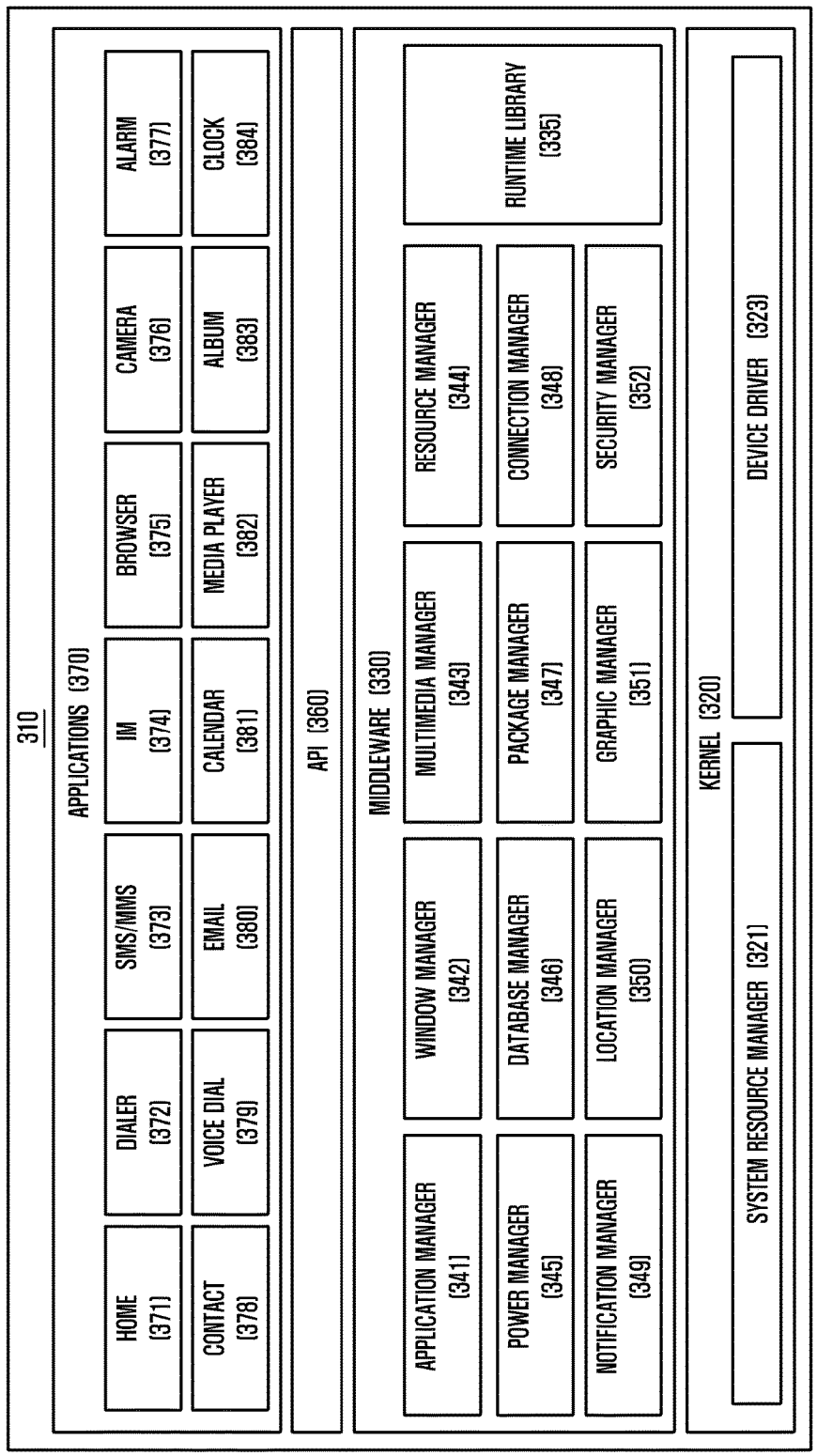
FIG. 3 is a block diagram illustrating a program module, according to an embodiment of the present disclosure.

FIG. 3 is a block diagram illustrating a programming module, according to an embodiment of the present disclosure.

Referring to FIG. 3, a programming module 310 may be included, or stored, in the electronic device 100, for example, the memory 130, as illustrated in FIG. 1. At least a part of the programming module 310 may be configured by software, firmware, hardware, and/or combinations of two or more thereof. The programming module 310 may include an OS that is implemented in hardware, e.g., the hardware 200 to control resources related to an electronic device, e.g., the electronic device 100, and/or various applications, e.g., the applications 370, driven on the OS. Referring to FIG. 3, the programming module 310 includes a kernel 320, middleware 330, an API 360, and the applications 370. At least part of the program module 310 may be preloaded on the electronic device or downloaded from a server (e.g., an electronic device 102, 104, server 106, etc.).

The kernel 320 includes at least one of a system resource manager 321 and a device driver 323. The system resource manager 321 may include, for example, a process manager, a memory manager, and a file system manager. The system resource manager 321 may control, allocate, and/or collect system resources. The device driver 323 may include, for example, a display driver, a camera driver, a BT driver, a shared memory driver, a USB driver, a keypad driver, a Wi-Fi driver, and an audio driver. Further, the device driver 323 may include an inter-process communication (IPC) driver.

The middleware 330 may include a plurality of modules implemented in advance for providing functions commonly used by the applications 370. Further, the middleware 330 may provide the functions through the API 360, such that the applications 370 may efficiently use restricted system resources within the electronic apparatus. For example, as shown in FIG. 3, the middleware 330 includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352 and a payment manager 354.

The runtime library 335 may include a library module that a compiler uses in order to add a new function through a programming language while one of the applications 370 is being executed. The runtime library 335 may perform an input/output, memory management, and/or a function for an arithmetic function.

The application manager 341 may manage a life cycle of at least one of the applications 370. The window manager 342 may manage graphical user interface (GUI) resources used by a screen. The multimedia manager 343 may detect formats used for reproduction of various media files, and may perform encoding and/or decoding of a media file by using a codec suitable for the corresponding format. The resource manager 344 may manage resources such as a source code, a memory, and a storage space of at least one of the applications 370.

The power manager 345 may manage a battery and/or power, while operating together with a basic input/output system (BIOS), and may provide power information used for operation. The database manager 346 may manage generation, search, and/or change of a database to be used by at least one of the applications 370. The package manager 347 may manage installation and/or an update of an application distributed in a form of a package file.

For example, the connectivity manager 348 may manage wireless connectivity such as Wi-Fi or BT. The notification manager 349 may display and/or notify of an event, such as an arrival message, a promise, a proximity notification, and the like, in such a way that does not disturb a user. The location manager 350 may manage location information of an electronic apparatus. The graphic manager 351 may manage a graphic effect which will be provided to a user, and/or a user interface related to the graphic effect. The security manager 352 may provide all security functions used for system security and/or user authentication. When an electronic apparatus, e.g., the electronic apparatus 100, has a telephone call function, the middleware 330 may further include a telephony manager for managing a voice and/or video communication function of the electronic apparatus. The payment manger 354 is capable of relaying payment information from the application 370 to an application 370 or a kernel 320. Alternatively, the payment manager 354 is capable of storing payment-related information received from an external device in the electronic device 200 or transmitting information stored in the electronic device 200 to an external device.

The middleware 330 may generate and use a new middleware module through various functional combinations of the aforementioned internal element modules. The middleware 330 may provide modules specialized according to types of OSs in order to provide differentiated functions. Further, the middleware 330 may dynamically remove some of the existing elements and/or add new elements. Accordingly, the middleware 330 may exclude some of the elements described in the various embodiments of the present disclosure, further include other elements, and/or substitute the elements with elements having a different name and performing a similar function.

The API 360 is a set of API programming functions, and may be provided with a different configuration according to the OS. For example, one API set may be provided for each of platforms, or two or more API sets may be provided.

The applications 370 may include, for example, a preloaded application and/or a third party application. The applications 370 include one or more of the following: a home application 371 a dialer application 372, an SMS/multimedia messaging service (MMS) application 373, an instant messaging (IM) application 374, a browser application 375, a camera application 376, an alarm application 377, a contact application 378, a voice dial application 379, an email application 380, a calendar application 381, a media player application 382, an album application 383, a clock application 384, a payment application 385, a health care application (e.g., the measurement of blood pressure, exercise intensity, etc.), an application for providing environment information (e.g., atmospheric pressure, humidity, temperature, etc.), etc. However, embodiments of the present disclosure are not limited thereto, and the applications 370 may include any other similar and/or suitable application.

According to an embodiment, the applications 370 are capable of including an application for supporting information exchange between an electronic device 101 and an external device 102 or 104, which is hereafter called 'information exchange application'. The information exchange application is capable of including a notification relay application for relaying specific information to external devices or a device management application for managing external devices.

For example, the notification relay application is capable of including a function for relaying notification information, created in other applications of the electronic device (e.g., SMS/MMS application, email application, health care application, environment information application, etc.) to external devices. In addition, the notification relay application is capable of receiving notification information from external devices to provide the received information to the user.

The device management application is capable of managing (e.g., installing, removing or updating) at least one function of an external device communicating with the electronic device. Examples of the function are a function of turning-on/off the external device or part of the external device, a function of controlling the brightness (or resolution) of the display, applications running on the external device, services provided by the external device, etc. Examples of the services are a call service, messaging service, etc.

According to an embodiment of the present disclosure, the applications 370 are capable of including an application (e.g., a health care application of a mobile medical device, etc.) specified attributes of an external device). The applications 370 are capable of including applications received from an external device. The applications 370 are capable of including a preloaded application or third party applications that can be downloaded from a server. It should be understood that the components of the program module 310 may be called different names according to the type of operating system.

According to various embodiments of the present disclosure, at least part of the program module 310 can be implemented with software, firmware, hardware, or any combination of two or more of them. At least part of the program module 310 can be implemented (e.g., executed) by a processor. At least part of the programming module 310 may include modules, programs, routines, sets of instructions or processes, etc., in order to perform one or more functions.

Figure 4:
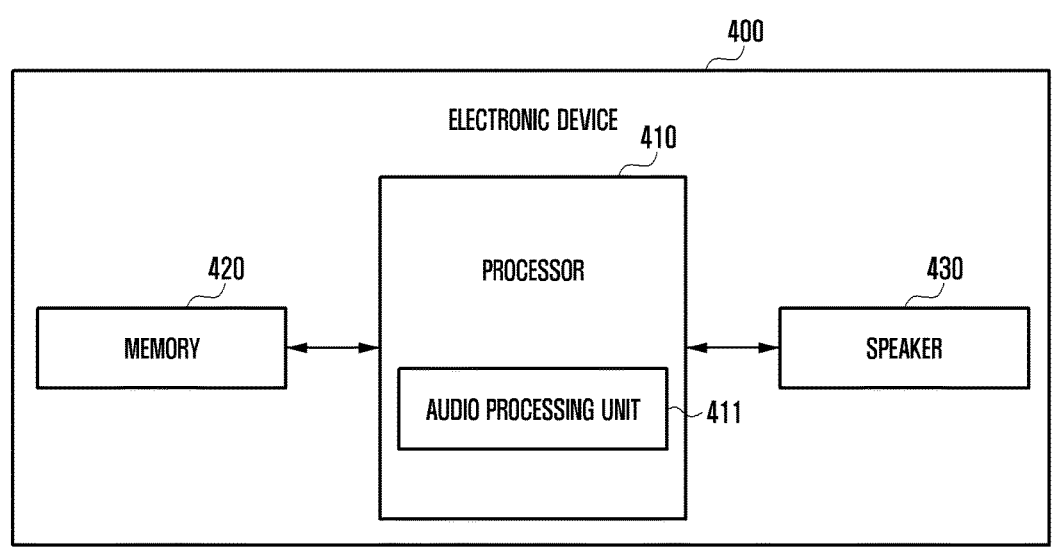
FIGS. 4 and 5 are block diagrams illustrating an electronic device, according to an embodiment of the present disclosure.

FIG. 4 is a block diagram illustrating an electronic device, according to an embodiment of the present disclosure.

The electronic device 400 includes a processor 410, a memory 420, and a speaker 430. The electronic device 400 may be the electronic device 101 of FIG. 1 or the electronic device 201 of FIG. 2. The processor 410 may be the processor 120 of FIG. 1 and/or the processor 210 of FIG. 2.

The electronic device 400 may include or not at least one of modules and elements of the electronic device 101 of FIG. 1 or the electronic device 201 of FIG. 2. The electronic device 400 may further include a communication module, a display, and/or the like. For example, the electronic device 400 may further include the communication interface 170 of FIG. 1 or the communication module 220 of FIG. 2, and the display 160 of FIG. 1 or the display 260 of FIG. 2.

The processor 410 includes an audio processing unit 411. The processor 410 may be electrically connected to the memory 420 and an audio output module (e.g., the speaker 430).

The processor 410 may obtain audio data according to the execution of an application, an input event detected on an input interface (e.g., a touch screen), and the like. For example, the processor 410 may output an audio signal generated by the execution of a multimedia application, a ringtone, a notification, an alarm, and an audio signal generated by a touch input.

The processor 410 may output an audio signal received through a communication module. For example, the processor 410 may output an audio signal received through short range wireless communication (e.g., Bluetooth).

The processor 410 may identify the type of the obtained audio data, based on predetermined criteria. The processor 410 may identify the type of the obtained audio data, based on an audio stream type contained in the audio data.

The processor 410 may include an audio processing unit 411. The audio processing unit 411 may include at least one of an equalizer (EQ), a mixer, a low pass filter, a band pass filter, a high pass filter, and a dynamic range control (DRC). For example, the audio processing unit 411 may check, through the memory 420, an audio stream type, a sample rate, and channel structure related information from among audio resources required for the output of audio. The audio stream type may have values corresponding to a call voice, a system sound effect, a ringtone, music, a clock alarm, a notification sound, and so on. When processing the obtained audio data, the audio processing unit 411 may identify the type of the audio data by checking the stream type of the audio data.

The processor 410 may identify the type of the obtained audio data through an API message or flag that indicates the type of the audio data. For example, when a certain application is executed, the audio processing unit 411 may receive the API message or flag that indicates the type of the audio data. Then, through the received API message or flag, the audio processing unit 411 may determine whether the obtained audio data is an audio track that requires a low delay.

The processor 410 may identify the type of the obtained audio data, based on the type of an application associated with the audio data. The processor 410 may identify the type of an application as the application is executed. For example, when any audio data is obtained, the processor 410 may identify the type of the obtained audio data by recognizing an application which is running in the foreground and/or the background. For example, if music data is obtained, the processor 410 may recognize applications running in the foreground and/or the background. If there is any multimedia application among the recognized applications, the processor 410 may identify the type of the obtained audio data as music data.

The processor 410 may identify the type of the obtained audio data, based on information about an execution history of the audio data. The processor 410 may retrieve previous execution information of the obtained audio data and/or of the application associated with the obtained audio data. Then, based on the retrieved previous execution information, the processor 410 may identify the type of the audio data. For example, when a certain application is executed, the processor 410 may retrieve the previous execution information of the application from the memory 420. Then, based on audio history information contained in the previous execution information, the processor 410 may identify the type of the audio data.

The processor 410 may select an audio processing mode corresponding to the identified type of the audio data.

The audio processing mode may be a first mode for processing an audio signal for each sample of audio data so as to improve a response speed of an audio track. The first mode may be selected when the audio track requires a fast output without delay. The first mode may also support a volume amplification function. The first mode may be a processing mode that supports audio data processing with buffers the number or size of which is smaller in comparison with second and third modes, which are described in greater detail below.

The audio processing mode may be a second mode for differently applying gains according to volume levels of audio data so as to improve a sound quality. For example, by interworking with volume information, the second mode may optimize the sound quality depending on volume levels. For example, when any audio data is processed, the second mode may support audio processing for lowering the amplification of audio signals contained in the audio data as the volume level of the audio data is reduced. Namely, if the volume level ranges from the 0 level to the 15 level, the second mode may lower the amplification (e.g., boosting) at the 0 level in comparison with at the 15 level and thus remove or minimize a white noise.

The audio processing mode may be a third mode that focuses on volume amplification of audio data. The third mode may perform signal processing for a part of the audio data stored in the buffer.

The processor 410 may select one of the first mode, the second mode, and the third mode in response to the identified type of the audio data. In an embodiment, if a plurality of audio data is obtained, the processor 410 may select audio processing algorithms corresponding to respective audio data. In an additional embodiment, if a signal for requesting the output of certain audio data through a communication module from an external device, the processor 410 may perform an audio processing algorithm by applying an output state of the audio data executed at the external device.

The processor 410 may output an audio track of the audio data, based on the selected audio processing mode. For example, when a touch input is detected from one of keypad items displayed on the touch screen, the processor 410 may select the first mode and output an audio signal corresponding to the keypad item. In another example, when audio data is obtained through a music application, the processor 410 may select the second mode and output an audio signal by applying a sound quality improving algorithm. In still another example, if ringtone data is obtained, the processor 410 may select the third mode and output an audio signal by applying a volume effect algorithm.

When selecting the audio processing mode corresponding to the type of the obtained audio data, the processor 410 may determine whether the audio data is an audio track that requires an improvement in output response speed. If the audio track is an audio track that requires an improvement in output response speed, the processor 410 may select the first mode.

If the audio track is not an audio track that requires an improvement in output response speed, the processor 410 may further determine whether the audio track is an audio track that requires an improvement in sound quality by varying gains depending on volume levels of the audio data. The processor 410 may select the second mode if the audio track requires an improvement in sound quality, and select the third mode if the audio track does not require an improvement in sound quality. If the audio track requires no improvement in output response speed, the processor 410 may store the audio track in a buffer.

The processor 410 may determine whether the audio data is an audio track that requires an improvement in sound quality. If the audio track requires an improvement in sound quality, the processor 410 may select the second mode. If the audio track does not require an improvement in sound quality, the processor 410 may further determine whether the audio track requires an output without delay. The processor 410 may select the first mode if the audio track requires an output without delay, and select the third mode if the audio track does not require an output without delay.

The processor 410 may be configured to obtain audio data, to identify a type of the obtained audio data, based on predetermined criteria, to select an audio processing mode corresponding to the identified type of the audio data, and to output an audio track of the audio data, based on the selected audio processing mode.

The processor 410 may be further configured to identify the type of the audio data, based on at least one of an audio stream type contained in the obtained audio data, an API message or flag indicating the type of the obtained audio data, a type of an application associated with the obtained audio data, and execution history information of the obtained audio data.

The audio processing mode may be one of a first mode for improving a response speed of the audio track by processing an audio signal for each sample of the audio data, a second mode for improving a sound quality by applying different gains depending on volume levels of the audio data, and a third mode for focusing on volume amplification.

The first mode may be a processing mode that supports audio data processing with buffers the number or size of which is smaller in comparison with the second and third modes.

The second mode may be a processing mode that supports audio processing for lowering amplification of the audio data as a volume value of the audio data is reduced.

When selecting the audio processing mode corresponding to the type of the obtained audio data, the processor 410 may be further configured to determine whether the audio data is an audio track requiring an improvement in the response speed, and to select the first mode if the audio data is the audio track requiring the improvement in the response speed.

If the audio data is not the audio track requiring the improvement in the response speed, the processor 410 may be further configured to determine whether the audio track is an audio track requiring an improvement in the sound quality by applying different gains depending on volume levels of the audio data, to select the second mode in case of the audio track that requires the improvement in the sound quality, and to select the third mode in case of the audio track that does not require the improvement in the sound quality.

The processor 410 may be further configured to store the audio track in a buffer in case of the audio track that does not require the improvement in the response speed.

The processor 410 may be configured to obtain audio data, to determine whether the obtained audio data is an audio track requiring an improvement in an output response speed, to select a first mode if the audio data is the audio track requiring the improvement in the output response speed, to further determine, if the audio data is not the audio track requiring the improvement in the output response speed, whether the audio data is an audio track requiring an improvement in a sound quality, to select a second mode if the audio data is the audio track requiring the improvement in the sound quality, and to select a third mode if the audio data is not the audio track requiring the improvement in the sound quality.

The first mode may process an audio signal for each sample of the audio data so as to support the improvement in the response speed of the audio track, the second mode may apply different gains depending on volume levels of the audio data so as to support the improvement in the sound quality, and the third mode may support audio processing focusing on volume amplification of the audio data.

The second mode may be a processing mode that supports audio processing for lowering amplification of the audio data as a volume value of the audio data is reduced. The processor 410 may be further configured to store the audio track in a buffer in case of the audio track that does not require the improvement in the response speed.

Figure 5:
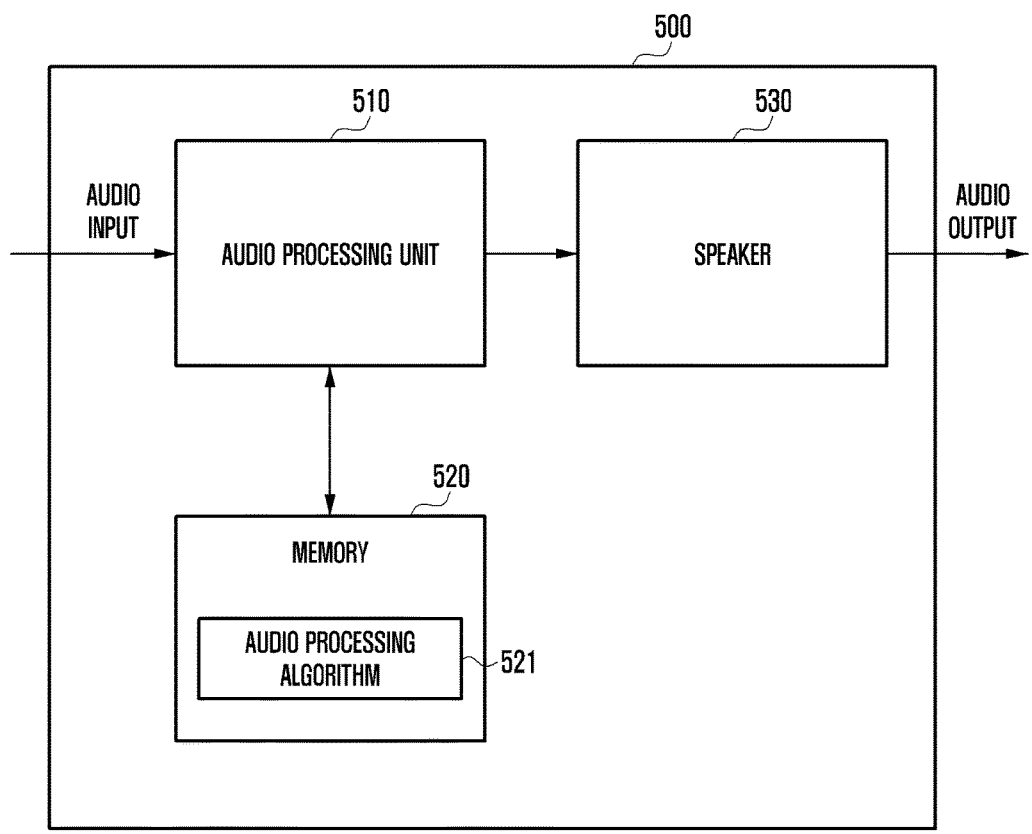

FIG. 5 is a block diagram illustrating an electronic device, according to an embodiment of the present disclosure.

An electronic device 500 according includes an audio processing unit 510, a memory 520, and a speaker 530. The electronic device 500 may be the electronic device 101 of FIG. 1, the electronic device 201 of FIG. 2, or the electronic device 400 of FIG. 4. The audio processing unit 510 may be the processor 210 and/or the audio module 280 of FIG. 2 or the audio processing unit 411 of FIG. 4. The memory 520 may include the memory 130 of FIG. 1, the memory 230 of FIG. 2, or the memory 420 of FIG. 4. The speaker 530 may be the speaker 282 of FIG. 2 or the speaker 430 of FIG. 4.

The electronic device 500 may include at least one of modules and elements of the electronic device 101 of FIG. 1 or the electronic device 201 of FIG. 2. The electronic device 500 may further include a communication module, a display, and/or the like. For example, the electronic device 500 may further include the communication interface 170 of FIG. 1 or the communication module 220 of FIG. 2, and the display 160 of FIG. 1 or the display 260 of FIG. 2.

The audio processing unit 510 may obtain audio data. The audio processing unit 510 may obtain audio data through a communication module, through an application stored in the memory 520, or through an input from an input interface.

The audio processing unit 510 may apply an audio processing algorithm 521 stored in the memory 520 to process the obtained audio data. The audio processing algorithm 521 may include a first mode algorithm for processing an audio signal for each sample of audio data so as to improve a response speed of an audio track, a second mode algorithm for differently applying gains according to volume levels of audio data so as to improve a sound quality, and a third mode algorithm that focuses on volume amplification of audio data.

The audio processing unit 510 may process the audio data by applying at least one of the first mode algorithm, the second mode algorithm, and the third mode algorithm stored in the audio processing algorithm 521.

The audio processing unit 510 may output the processed audio data through the speaker 530.

Figure 6:
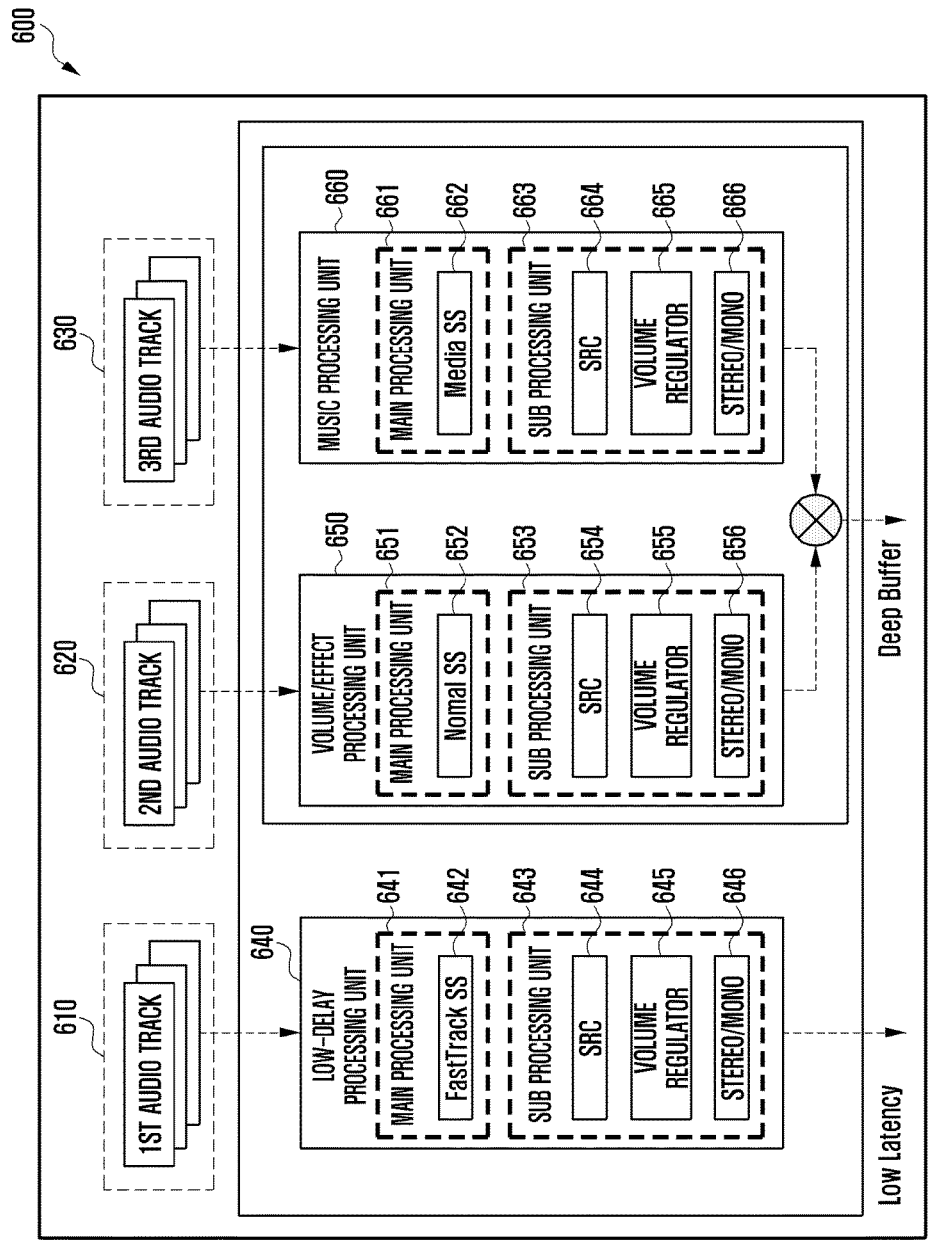
FIG. 6 is a block diagram illustrating an audio processing unit, according to an embodiment of the present disclosure.

FIG. 6 is a block diagram illustrating an audio processing unit, according to an embodiment of the present disclosure.

An audio processing unit 600 may obtain audio data. The obtained audio data may be divided into a first audio track 610, a second audio track 620, and a third audio track 630 according to predetermined criteria. For example, the first audio track 610 may be an audio track associated with a system sound, a touch input on a touch screen, and the like. The second audio track 620 may be an audio track associated with a ringtone, a notification, an alarm, and the like. The third audio track 630 may be an audio track associated with music, video, game background music, and the like.

The audio processing unit 600 supports functions of a low-delay processing unit 640, a volume/effect processing unit 650, and a music processing unit 660 through an algorithm stored in a memory. Herein, the term 'unit' is used for convenience of explanation, and the above functions may be performed in software and/or functionally.

The low-delay processing unit 640, the volume/effect processing unit 650, and the music processing unit 660 include main processing units 641, 651 and 661, each having a sound solution (SS), and sub processing units 643, 653 and 663.

The main processing unit 641 of the low-delay processing unit 640 includes a fast-track SS 642. The fast-track SS 642 may support a function of removing a sample delay by processing an audio signal for each sample of audio data. The fast-track SS 642 may support a function of increasing the volume of audio data.

The main processing unit 651 of the volume/effect processing unit 650 includes a normal SS 652. The normal SS 652 may support a function of increasing the volume of audio data.

The main processing unit 661 of the music processing unit 660 includes a media SS 662. The media SS 662 may optimize a sound quality depending on volume levels by interworking with volume information of audio data. The media SS 662 may include an equalizer (EQ). The equalizer may adjust the frequency of an audio signal. For example, the equalizer may change the frequency characteristics of an audio signal. In another example, the equalizer may be a graphic equalizer for dividing an audio signal into several frequency bands, a parametric equalizer for varying a boost-cut frequency, and the like.

Each of the sub processing units 643, 653 and 663 of the low-delay processing unit 640, the volume/effect processing unit 650, and the music processing unit 660 includes a sample rate conversion (SRC) 644, 654 and 664, a volume regulator 645, 655 and 665, and stereo/mono 646, 656 and 666.

The SRC 644, 654 and 664 of the low-delay processing unit 640, the volume/effect processing unit 650, and the music processing unit 660 may change a sampling rate of an audio discrete signal. The sample rate conversion may use a low pass filter or interpolation. For example, the sample rate conversion may perform a sampling frequency conversion, a scaling, an audio data processing using a decimation filter, and the like.

The volume regulator 645, 655 and 665 of the low-delay processing unit 640, the volume/effect processing unit 650, and the music processing unit 660 may regulate the volume of audio data.

The stereo/mono 646, 656 and 666 of the low-delay processing unit 640, the volume/effect processing unit 650, and the music processing unit 660 may check and adjust a channel of received audio data (e.g., left/right output speakers, etc.).

The low-delay processing unit 640 may output an audio signal corresponding to the first audio track 610 without delay. The volume/effect processor 650 and the music processor 660 may output audio signals corresponding to the second audio track 620 and the third audio track 630, respectively, through a mixer.

Figure 7:
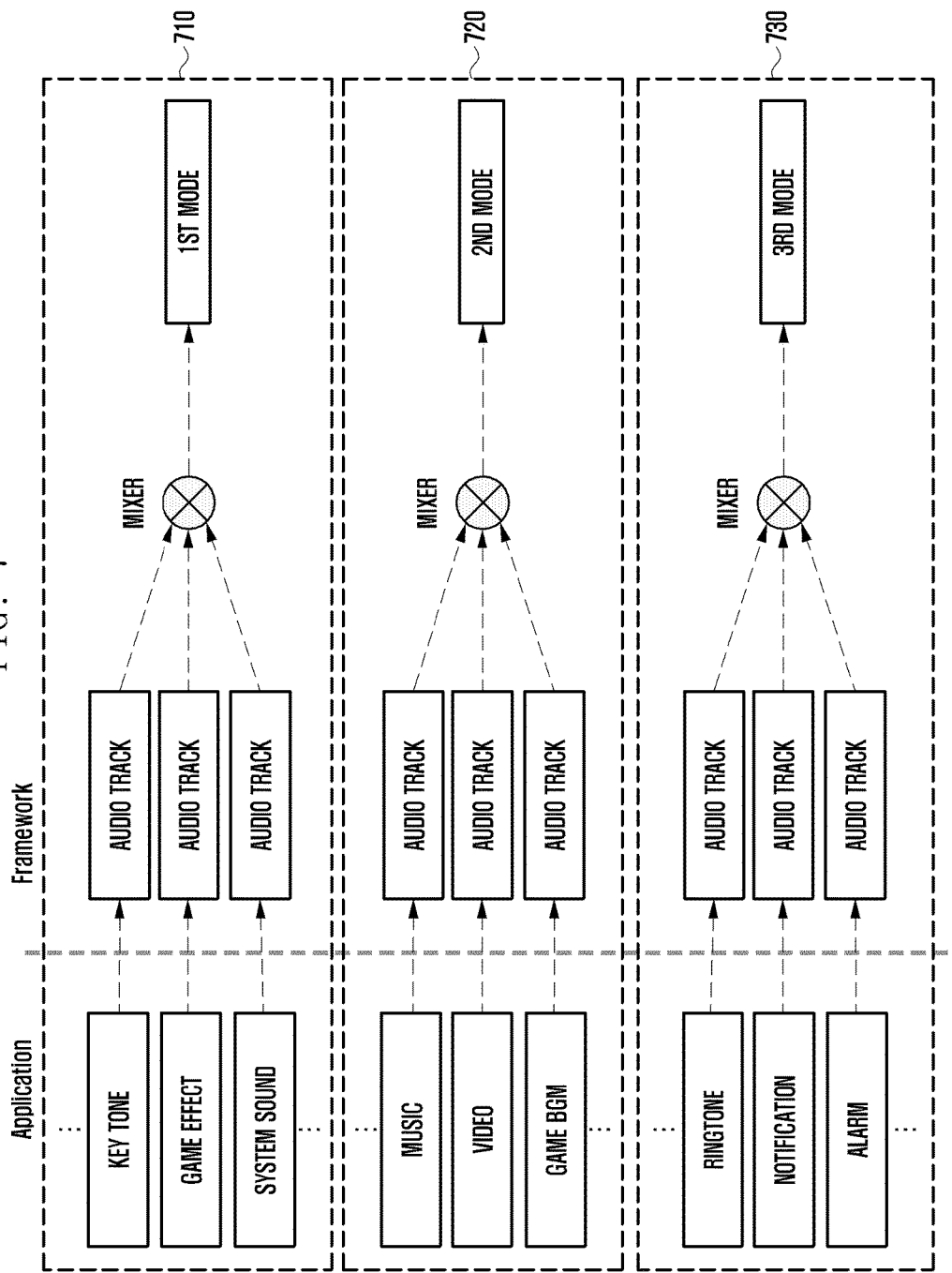
FIG. 7 is a schematic diagram illustrating audio data processing, according to an embodiment of the present disclosure.

FIG. 7 is a diagram illustrating audio data processing, according to an embodiment of the present disclosure.

The electronic device 400 may apply different audio processing algorithms, based on types of the obtained audio data.

Referring to reference number 710, the electronic device 400 may obtain audio tracks, such as a key-tone, a game effect, and a system sound, which require an output without delay. When audio tracks associated with a key-tone, a game effect, and a system sound are obtained, the electronic device 400 may apply an algorithm without sample delay by processing an audio signal for each sample. When audio tracks requiring an output without delay, such as a key-tone, a game effect, and a system sound are obtained, the electronic device 400 may select the first mode and output audio signals. For example, the electronic device 400 may output audio signals of the audio tracks such as a key-tone, a game effect, and a system sound through the mixer and the fast-track SS shown in FIG. 6.

Referring to reference number 720, the electronic device 400 may obtain audio tracks associated with music, video, and game background music. In this case, the electronic device 400 may output audio signals by applying an algorithm that varies in amplification according to volume levels. When audio tracks associated with music, video, and game background music are obtained, the electronic device 400 may select the second mode and output audio signals. For example, the electronic device 400 may output audio signals of the audio tracks associated with music, video, and game background music through the mixer and the media SS shown in FIG. 6.

Referring to a reference number 730, the electronic device 400 may obtain audio tracks associated with a ringtone, a notification, and an alarm. In this case, the electronic device 400 may output audio signals by applying an algorithm which focuses on volume amplification. When audio tracks associated with a ringtone, a notification, and an alarm are obtained, the electronic device 400 may select the third mode and output audio signals. For example, the electronic device 400 may output audio signals of the audio tracks associated with a ringtone, a notification, and an alarm through the mixer and the normal SS shown in FIG. 6.

Figure 8:
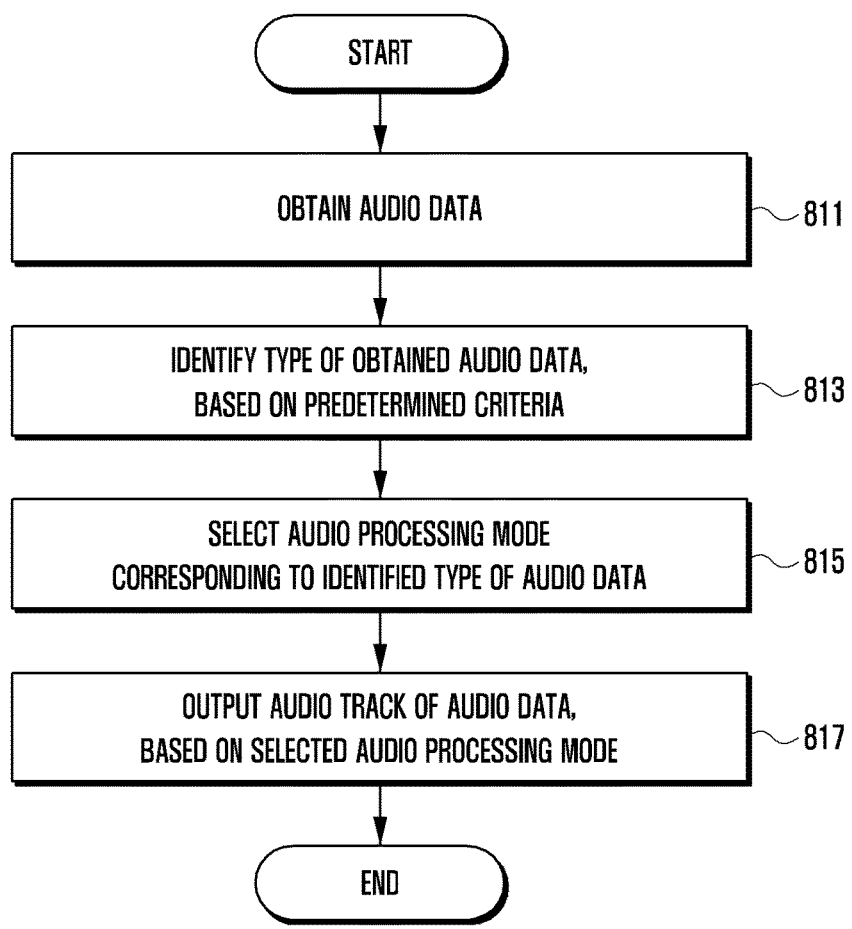
FIGS. 8 to 10 are flow diagrams illustrating a method for processing audio data, according to an embodiment of the present disclosure.

FIG. 8 is a flow diagram illustrating a method for processing audio data, according to an embodiment of the present disclosure.

In step 811, the electronic device 400 obtains audio data. The processor 410 may obtain audio data according to the execution of an application, an input event detected on an input interface (e.g., a touch screen), and the like. For example, the processor 410 may output an audio signal generated by the execution of a multimedia application, a ringtone, a notification, an alarm, and an audio signal generated by a touch input.

In step 813, the electronic device 400 identifies the type of the obtained audio data, based on predetermined criteria.

The electronic device 400 may identify the type of the obtained audio data, based on at least one of an audio stream type contained in the obtained audio data, an API message, or flag indicating the type of audio data, the type of an application associated with the obtained audio data, and execution history information of the audio data.

In step 815, the electronic device 400 may select an audio processing mode corresponding to the identified type of the audio data.

When selecting the audio processing mode corresponding to the type of the obtained audio data, the electronic device 400 may determine whether the audio data is an audio track that requires an improvement in output response speed. If the audio track is an audio track that requires an improvement in output response speed, the electronic device 400 may select the first mode.

If the audio track is not an audio track that requires an improvement in output response speed, the electronic device 400 may further determine whether the audio track is an audio track that requires an improvement in sound quality by varying gains depending on volume levels of the audio data.

If the audio track requires an improvement in sound quality, the electronic device 400 may select the second mode.

If the audio track does not require an improvement in sound quality, the electronic device 400 may select the third mode. If the audio track requires no improvement in output response speed, the electronic device 400 may store the audio track in a buffer.

The audio processing mode may be one of a first mode for processing an audio signal for each sample of audio data so as to improve a response speed of an audio track, a second mode for differently applying gains according to volume levels of audio data so as to improve a sound quality, and a third mode that focuses on volume amplification of audio data.

The first mode may be a processing mode that supports audio data processing with buffers the number or size of which is smaller in comparison with the second and third modes. The second mode may be a mode that supports audio processing for lowering the amplification of audio signals contained in the audio data as the volume level of the audio data is reduced.

In step 817, the electronic device 400 outputs an audio track of the audio data, based on the selected audio processing mode. For example, the electronic device 400 may output an audio signal through the speaker.

Figure 9:
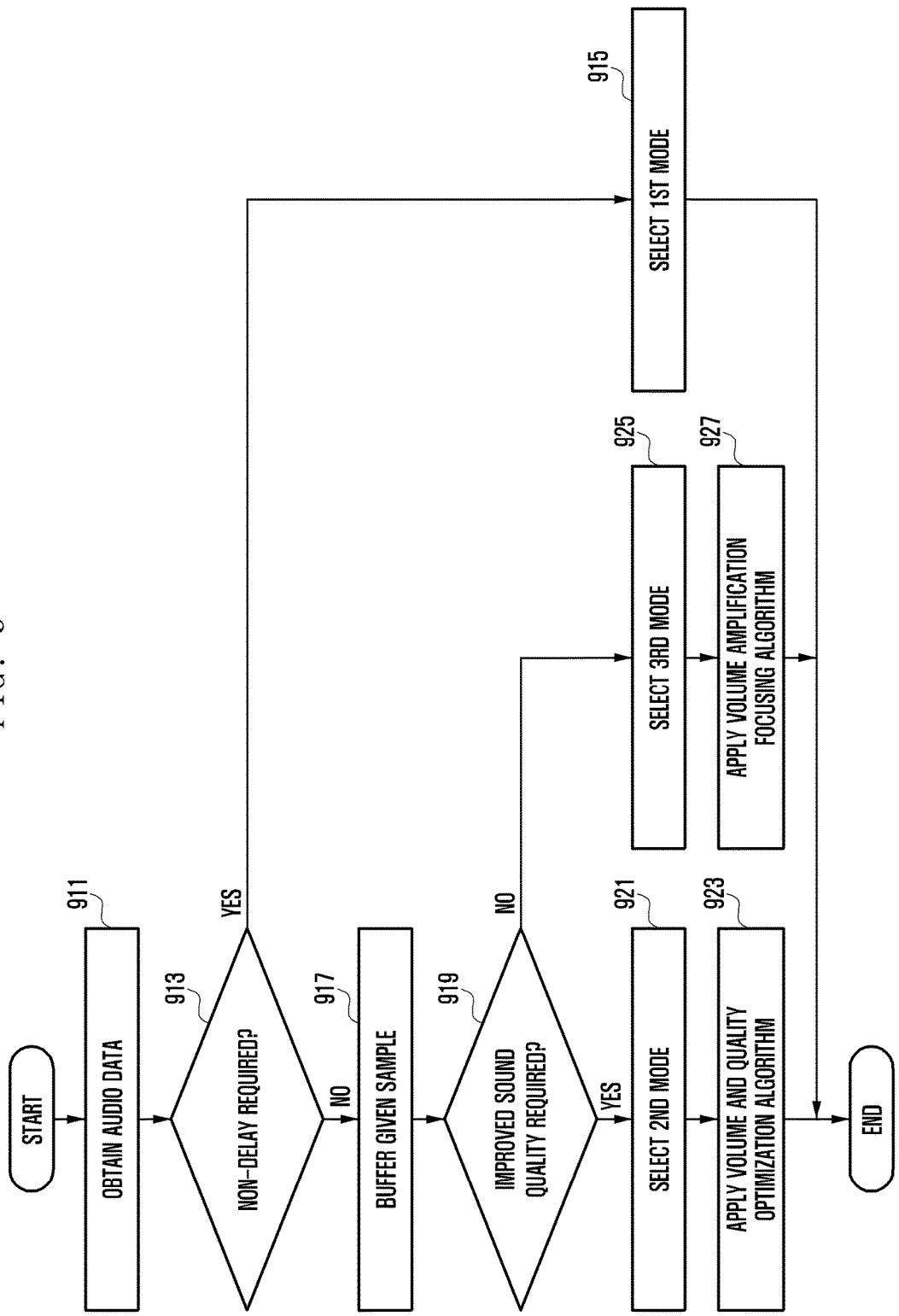

FIG. 9 is a flow diagram illustrating a method for processing audio data, according to an embodiment of the present disclosure.

In step 911, the electronic device 400 obtains audio data. The audio data may be obtained when an application is executed, when an input event is detected from an input interface (e.g., a touch screen), and the like. For example, the processor 410 may output an audio signal generated by the execution of a multimedia application, a ringtone, a notification, an alarm, and an audio signal generated by a touch input.

In step 913, the electronic device 400 determines whether audio data requires non-delay. The electronic device 400 may determine whether the obtained audio data requires an improvement in a response speed. For example, the electronic device 400 may determine whether audio data associated with a touch input on a keypad of the touch screen is obtained.

When the audio data requires processing without delay, the electronic device 400 selects the first mode, in step 915. The first mode may be a mode for improving a response speed of an audio track by processing the audio signal for each sample of the audio data.

When the audio data does not require processing without delay, the electronic device 400 buffers given samples of the audio data, in step 917. For example, if the obtained audio data is not a touch input on the keypad of the touch screen, the electronic device 400 may buffer given samples of audio data.

In step 919, the electronic device 400 determines whether the audio data requires an improvement in a sound quality. For example, the electronic device 400 may determine whether the obtained audio data is music sound related data.

When the audio data requires an improvement in a sound quality, the electronic device 400 selects the second mode, in step 921. The second mode may support a function of improving a sound quality by applying different gains depending on volume levels of the audio data. For example, the electronic device 400 may remove a white noise by minimizing amplification at low volume levels.

The electronic device 400 applies a volume and quality optimization algorithm. This algorithm of the second mode may be an algorithm for optimizing a sound quality depending on a volume level by interworking with volume information.

In step 925, the electronic device 400 selects the third mode when the audio data does not require an improvement in a sound quality.

In step 927, the electronic device 400 applies a volume amplification focusing algorithm. The electronic device 400 may process the audio data in view of volume.

Figure 10:
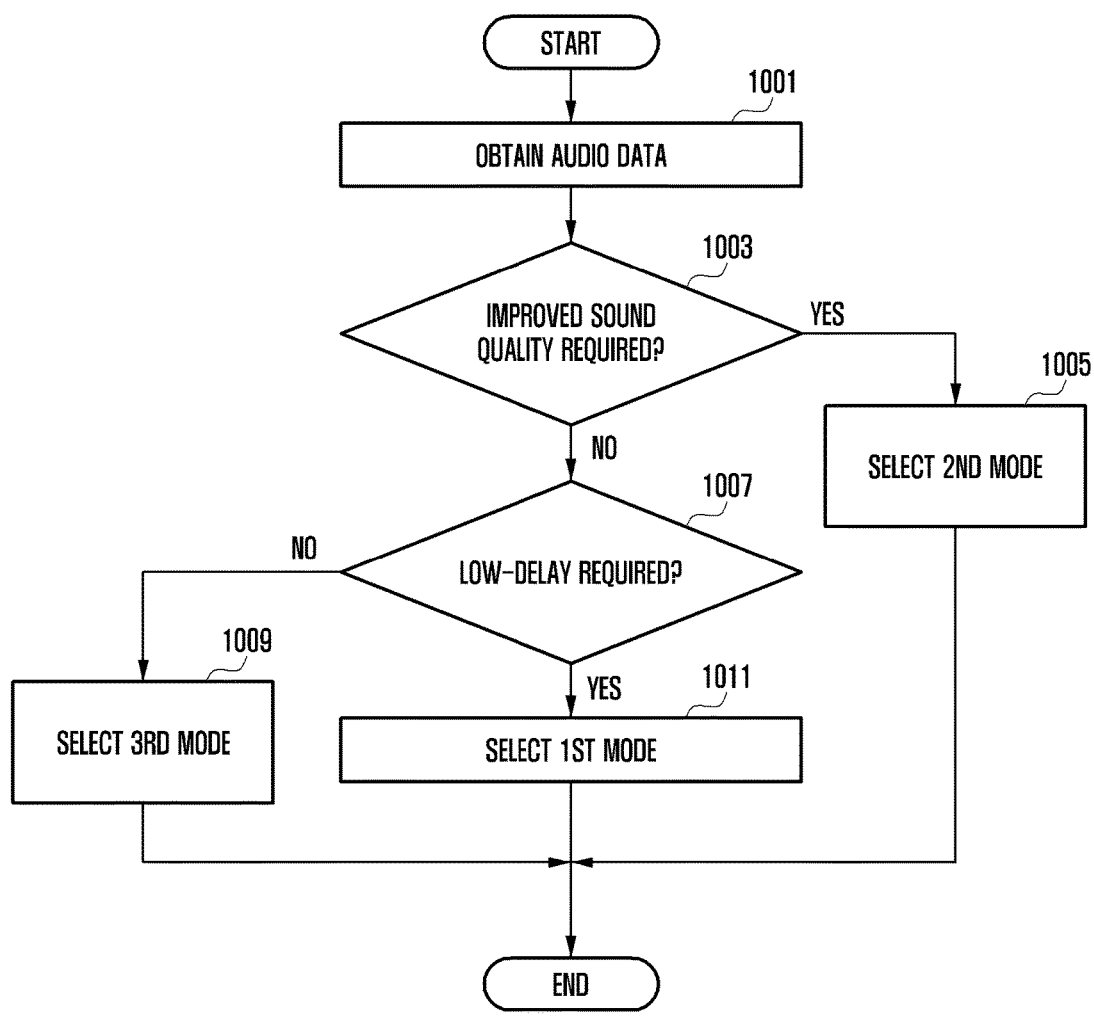

FIG. 10 is a flow diagram illustrating a method for processing audio data, according to an embodiment of the present disclosure.

In step 1001, the electronic device 400 obtains audio data. The electronic device 400 may receive an output request for an audio signal associated with the activation of a certain application, for a ringtone, or for an audio signal received from an external device. In response to the received output request, the electronic device 400 may process the obtained audio data.

In step 1003, the electronic device 400 determines whether the obtained audio data requires an improvement in a sound quality. For example, the electronic device 400 may determine whether the obtained audio data is a music sound that requires audio frequency adjustment and amplification.

When improved sound quality is required, the electronic device 400 selects the second mode, in step 1005. The electronic device 400 may select the second mode for improving a sound quality by applying different gains depending on volume levels of audio data.

When improved sound quality is not required, the electronic device 400 determines whether a low delay is required, in step 1007. For example, the electronic device 400 may determine whether there is a touch input on the keypad of a touch screen that requires the output of an audio signal without delay.

When output without delay is not required, the electronic device 400 selects the third mode, in step 1009. The electronic device 400 may apply an algorithm that focuses on volume amplification of audio data.

When output without delay is required, the electronic device 400 selects the first mode, in step 1011. The first mode may support a function of improving a response speed of an audio track by processing an audio signal for each sample of the audio data.

The electronic device 400 may perform operations of obtaining audio data; identifying a type of the obtained audio data, based on predetermined criteria; selecting an audio processing mode corresponding to the identified type of the audio data; and outputting an audio track of the audio data, based on the selected audio processing mode.

The electronic device 400 may perform an operation of identifying the type of the audio data, based on at least one of an audio stream type contained in the obtained audio data, an API message or flag indicating the type of the obtained audio data, a type of an application associated with the obtained audio data, and execution history information of the obtained audio data.

The audio processing mode may be one of a first mode for improving a response speed of the audio track by processing an audio signal for each sample of the audio data, a second mode for improving a sound quality by applying different gains depending on volume levels of the audio data, and a third mode for focusing on volume amplification.

The first mode may be a processing mode that supports audio data processing with buffers the number or size of which is smaller in comparison with the second and third modes.

The second mode may be a processing mode that supports audio processing for lowering amplification of the audio data as a volume value of the audio data is reduced.

The electronic device 400 may perform operations of determining whether the audio data is an audio track requiring an improvement in the response speed, and selecting the first mode if the audio data is the audio track requiring the improvement in the response speed.

The electronic device 400 may perform operations of, if the audio data is not the audio track requiring the improvement in the response speed, determining whether the audio track is an audio track requiring an improvement in the sound quality by applying different gains depending on volume levels of the audio data, selecting the second mode in case of the audio track that requires the improvement in the sound quality, and selecting the third mode in case of the audio track that does not require the improvement in the sound quality.

The electronic device 400 may perform operation of storing the audio track in a buffer in case of the audio track that does not require the improvement in the response speed.

Herein, the first mode, the second mode, and the third mode are used merely for distinguishing each mode.

The above-described operations may not be sequential, and the electronic device 400 may store instructions for executing the above operations in the memory 420. The processor 410 may perform related functions in accordance with the instructions for executing the operations.

Herein, the term "module" refers to a "unit" including hardware, software, firmware, or a combination thereof. For example, the term "module" is interchangeable with the terms "unit," "logic," "logical block," "component," "circuit," or the like. A module may be the smallest unit or a part of an integrated component. A module may be the smallest unit or a part thereof that can perform one or more functions. A module may be implemented in mechanical or electronic mode. For example, a module may include at least one of the following: an application specific integrated circuit (ASIC) chip, field-programmable gate array (FPGAs), and a programmable-logic device that can perform functions that are known or will be developed.

At least part of the method (e.g., operations) or devices (e.g., modules or functions) may be implemented with instructions that can be conducted via various types of computers and stored in computer-readable storage media, as types of programming modules, for example. One or more processors (e.g., processor 120) can execute command instructions, thereby performing the functions. An example of the computer-readable storage media may be memory 130.

Examples of computer-readable media include: magnetic media, such as hard disks, floppy disks, and magnetic media (e.g., magnetic tape); optical media such as compact disc-ROM (CD-ROM) disks and DVDs; magneto-optical media, such as floptical disks; and hardware devices such as ROM, RAM, flash memory, etc. Examples of program instructions include machine code instructions created by assembly languages, such as a compiler, and code instructions created by a high-level programming language executable in computers using an interpreter, etc. The described hardware devices may be configured to act as one or more software modules to perform the operations of various embodiments described above, or vice versa.

Modules or programming modules may include one or more components described above, or with additional components. The operations performed by modules, programming modules, or other components may be executed in serial, parallel, repetitive, or heuristic fashion. Part of the operations can be executed in any other order, skipped, or executed with additional operations.

While the disclosure has been shown and described with reference to certain embodiments thereof, it will be understood by those skilled in the art that various changes in form and detail may be made therein without departing from the spirit and scope of the disclosure as defined by the appended claims.

What is claimed is:

1. An electronic device comprising:
   a memory;
   an audio output module; and
   a processor electrically connected to the memory and the audio output module,
   wherein the processor is configured to:
      obtain audio data,
      identify a type of the audio data,
      determine whether an audio track of the audio data requires an improvement in a response speed based on the type of the audio data,
      select a first mode as an audio processing mode if the audio track requires the improvement in the response speed,
      determine whether the audio track requires an improvement in a sound quality by applying different gains depending on volume levels of the audio data if the audio track does not require the improvement in the response speed,
      select a second mode as the audio processing mode if the audio track requires the improvement in the sound quality,
      select a third mode as the audio processing mode if the audio track does not require the improvement in the sound quality, and
      output the audio track of the audio data, based on the selected audio processing mode.

2. The electronic device of claim 1, wherein the processor is further configured to:
   identify the type of the audio data based on at least one of an audio stream type contained in the audio data, an application programming interface (API) message or flag indicating the type of the audio data, a type of an application associated with the audio data, or execution history information of the audio data.

3. The electronic device of claim 1, wherein the first mode is for improving the response speed of the audio track by processing an audio signal for each sample of the audio data, the second mode is for improving a sound quality by applying different gains depending on volume levels of the audio data, and the third mode is for focusing on volume amplification.

4. The electronic device of claim 3, wherein the first mode supports audio data processing with buffers, and a number or a size of the buffers is smaller in comparison with that of the second and third modes.

5. The electronic device of claim 3, wherein the second mode supports audio processing for lowering amplification of the audio data as a volume value of the audio data is reduced.

6. The electronic device of claim 1, wherein the processor is further configured to store the audio track in a buffer, if the audio track does not require the improvement in the response speed.

7. An electronic device comprising;
   a memory;
   an audio output module; and
   a processor electrically connected to the memory and the audio output module,
   wherein the processor is configured to:
      obtain audio data,
      determine whether the audio data is an audio track requiring an improvement in an output response speed,
      select a first mode, if the audio data is the audio track requiring the improvement in the output response speed,
      if the audio data is not the audio track requiring the improvement in the output response speed, determine whether the audio data is an audio track requiring an improvement in a sound quality, select a second mode if the audio data is the audio track requiring the improvement in the sound quality, and select a third mode if the audio data is not the audio track requiring the improvement in the sound quality.

8. The electronic device of claim 7, wherein the first mode processes an audio signal for each sample of the audio data so as to support the improvement in the response speed of the audio track, the second mode applies different gains depending on volume levels of the audio data so as to support the improvement in the sound quality, and the third mode supports audio processing focusing on volume amplification of the audio data.

9. The electronic device of claim 8, wherein the second mode supports audio processing for lowering amplification of the audio data as a volume value of the audio data is reduced.

10. The electronic device of claim 7 wherein the processor is further configured to store the audio track in a buffer, if the audio data is not the audio track that requires the improvement in the response speed.

11. A method for processing audio data at an electronic device, the method including operations of:
   obtaining audio data;
   identifying a type of the audio data;
   determining whether an audio track of the audio data requires an improvement in a response speed based on the type of the audio data;
   selecting a first mode as an audio processing mode if the audio track requires the improvement in the response speed;
   determining whether the audio track requires an improvement in a sound quality by applying different gains depending on volume levels of the audio data if the audio track does not require the improvement in the response speed;
   selecting a second mode as the audio processing mode if the audio track requires the improvement in the sound quality;
   selecting a third mode as the audio processing mode if the audio track does not require the improvement in the sound quality;

outputting the audio track of the audio data, based on the selected audio processing mode.

12. The method of claim 11, wherein identifying the type of the audio data comprises:

identifying the type of the audio data based on at least one of an audio stream type contained in the audio data, an application programming interface (API) message or flag indicating the type of the audio data, a type of an application associated with the audio data, or execution history information of the audio data.

13. The method of claim 11, wherein the first mode is for improving the response speed of the audio track by processing an audio signal for each sample of the audio data, the second mode is for improving a sound quality by applying different gains depending on volume levels of the audio data, and the third mode is for focusing on volume amplification.

14. The method of claim 13, wherein the first mode supports audio data processing with buffers, and a number or a size of the buffers is smaller in comparison with that of the second and third modes.

15. The method of claim 13, wherein the second mode supports audio processing for lowering amplification of the audio data as a volume value of the audio data is reduced.

16. The method of claim 11, further comprising:

storing the audio track in a buffer, if the audio track does not require the improvement in the response speed.

* * * * *